United States Patent
Kouznetsov (10) Patent No.: US 6,973,577 B1
(45) Date of Patent: *Dec. 6, 2005

(54) SYSTEM AND METHOD FOR DYNAMICALLY DETECTING COMPUTER VIRUSES THROUGH ASSOCIATIVE BEHAVIORAL ANALYSIS OF RUNTIME STATE

(75) Inventor: Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,810

(22) Filed: May 26, 2000

(51) Int. Cl.$^7$ .......... G06F 11/30; G06F 12/14; H04L 9/00; H04L 9/32
(52) U.S. Cl. ........ 713/200; 713/188; 713/200; 713/201; 714/25; 714/28; 714/38; 714/39; 707/9; 709/223; 709/224
(58) Field of Search .......... 713/200, 201, 713/188, 164; 709/224, 23, 24; 714/38, 24, 714/25, 39; 707/9

(56) References Cited

U.S. PATENT DOCUMENTS

| | | | | |
|---|---|---|---|---|
| 5,278,901 A | * | 1/1994 | Shieh et al. | 713/200 |
| 5,398,196 A | * | 3/1995 | Chambers | 714/28 |
| 5,684,875 A | * | 11/1997 | Ellenberger | 482/4 |
| 5,842,002 A | * | 11/1998 | Schnurer et al. | 703/21 |
| 5,960,170 A | * | 9/1999 | Chen et al. | 714/38 |
| 6,088,804 A | * | 7/2000 | Hill et al. | 713/201 |
| 6,279,113 B1 | * | 8/2001 | Vaidya | 713/201 |
| 6,338,141 B1 | * | 1/2002 | Wells | 713/200 |
| 6,357,008 B1 | * | 3/2002 | Nachenberg | 713/200 |
| 6,405,318 B1 | * | 6/2002 | Rowland | 713/200 |
| 6,711,583 B2 | * | 3/2004 | Chess et al. | 707/104.1 |
| 6,874,087 B1 | * | 3/2005 | Fetkovich et al. | 713/200 |
| 2001/0039579 A1 | * | 11/2001 | Trcka et al. | 709/224 |

FOREIGN PATENT DOCUMENTS

JP    08044556 A  *  2/1996   ......... G06F 9/06

OTHER PUBLICATIONS

Le Charlier et al. Dynamic detection and classification of computer viruses using general behaviour patterns, Jul. 2, 1995.*
Copy of Office Action Summary from U.S. Appl. No. 09/846,103 which was mailed on Mar. 11, 2005.

* cited by examiner

*Primary Examiner*—Hosuk Song
*Assistant Examiner*—Beemnet W Dada
(74) *Attorney, Agent, or Firm*—Zilka-Kotab, PC; Christopher J. Hamaty (57) ABSTRACT

A system and a method for dynamically detecting computer viruses through associative behavioral analysis of runtime state are described. A group of monitored events is defined. Each monitored event includes a set of one or more actions defined within an object. Each action is performed by one or more applications executing within a defined computing environment. The runtime state within the defined computing environment is continuously monitored for an occurrence of any one of the monitored events in the group. The sequence of the execution of the monitored events is tracked for each of the applications. Each occurrence of a specific event sequence characteristic of computer virus behavior and the application that performed the specific event sequence, are identified. A histogram describing the specific event sequence occurrence for each of the applications is created. Repetitions of the histogram associated with at least one object are identified.

12 Claims, 8 Drawing Sheets

SYSTEM AND METHOD FOR DYNAMICALLY DETECTING COMPUTER VIRUSES THROUGH ASSOCIATIVE BEHAVIORAL ANALYSIS OF RUNTIME STATE

CROSS-REFERENCE TO RELATED APPLICATION

This patent application is related to a commonly-assigned U.S. patent application Ser. No. 09/580,375, entitled "System And Method For Dynamically Detecting Computer Viruses Through Behavioral. Analysis Of Distributed Runtime State Using An Analysis Tree," filed May 26, 2000, pending, the disclosure of which is incorporated herein by reference.

FIELD OF THE INVENTION

The present invention relates in general to computer virus detection, and, in particular, to a system and method for dynamically detecting computer viruses through associative behavioral analysis of runtime state.

BACKGROUND OF THE INVENTION

Information networks interconnecting computational resources have become a mainstay of corporate enterprise computing environments. Generally, these environments consist of host computer systems interconnected internally over an intranetwork to which individual workstations and network resources are connected. These intranetworks, also known as local area networks, make legacy databases and information resources widely available for access and data exchange. These corporate resources can also be interconnected to wide area networks, including public information internetworks, such as the Internet, to enable internal users access to remote data exchange and computational resources; such as the World Wide Web, and to allow outside users access to select corporate resources for completing limited transactions or data transfer.

Unfortunately, a minority of surreptitious users abuse computer interconnectivity by creating and distributing computer viruses and other types of unsolicited "malware." Computer viruses are self-replicating program code which often carry malicious and sometimes destructive payloads. Besides computer viruses, malware can include Trojan horses, hoaxes, and "Spam" mail," such as, described in "McAfee.com: Virus Glossary of Terms," http://www.mcafee.com/viruses/virus_glossary.asp, Network Associates, Inc., (2000), the disclosure of which is incorporated herein by reference. Broadly stated, computer viruses include any type of object within which self-replicating executable computer code can be stored, disseminated and directly or indirectly executed. These objects include conventional applications, macros, electronic mail messages and attachments, and even hypertext references.

In the prior art, there are three basic methodologies used to detect computer viruses. First, scanning performs a static check of stored computer files and involves searching the files for byte sequences, known as virus signatures, which uniquely identify known viruses. However, scanning is time-consuming and can result in false positives, that is, non-viral files falsely identified as containing a virus. Moreover, the mere presence of a virus signature is no guarantee that the rest of the file is infected, as the "viral" code might never actually execute due to program errors. Finally, polymorphic viruses can successfully evade detection virus scanners by changing their appearance with each replication.

Second, behavior checkers observe program execution and generate alerts upon the occurrence of events that indicate unusual program behavior. Such behavior includes attempting to write to the boot sector of a storage drive or to open executable files in read/write mode. However, behavior checkers typically focus on specific events occurring in isolation. Often, these events are being performed by legitimate applications and not by computer viruses. As well, the nature of these events is highly technical and suspect behavior alerts, while well intentioned, might simply be ignored by the average user.

Third, integrity checkers create a log of characteristics for each of the stored computer files. The files are periodically re-checked by the integrity checker and the user is notified of any changes. However, some computer viruses falsify the characteristics of those files that have been infected, thereby defeating the integrity checkers. Also, a change in characteristics does not necessary indicate the presence of a virus.

Therefore, there is a need for an approach to dynamically analyzing program behavior to determine if a computer virus is present. Preferably, knowledge of specific, pre-identified computer viruses would not be necessary and the approach would instead observe behavioral patterns typical of computer viruses. The approach would track patterns of suspect events and analyze the stored patterns for repeated behaviors indicative of computer viruses.

SUMMARY OF THE INVENTION

The present invention provides a system and method for dynamically detecting computer virus activities through active monitoring of runtime execution state. The runtime state is monitored and compared to a set of monitored events. The occurrence of any one of the monitored events triggers tracking of the subsequent sequence of events. Suspect sequences characteristic of potentially viral activity are identified and histograms are generated. A virus alert is generated if the histograms illustrate repeated suspect sequences.

An embodiment of the present invention is a system and a method for dynamically detecting computer viruses through associative behavioral analysis of runtime state. A group of monitored events is defined. Each monitored event includes a set of one or more actions defined within an object. Each action is performed by one or more applications executing within a defined computing environment. The runtime state within the defined computing environment is continuously monitored for an occurrence of any one of the monitored events in the group. The sequence of the execution of the monitored events is tracked for each of the applications. Each occurrence of a specific event sequence characteristic of computer virus behavior and the application that performed the specific event sequence, are identified. A histogram describing the specific event sequence occurrence for each of the applications is created. Repetitions of the histogram associated with at least one object are identified.

One benefit of the present invention is that a priori knowledge of specific computer viruses is not necessary. Rather, patterns of behavior characteristic of computer viruses are observed and analyzed. Repetitions of suspicious behavior generate an alert of potential viral activity.

Another benefit is the present invention can combine conventional approaches to dynamic virus checking, in particular, behavior checking, with associative analyses using histograms.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
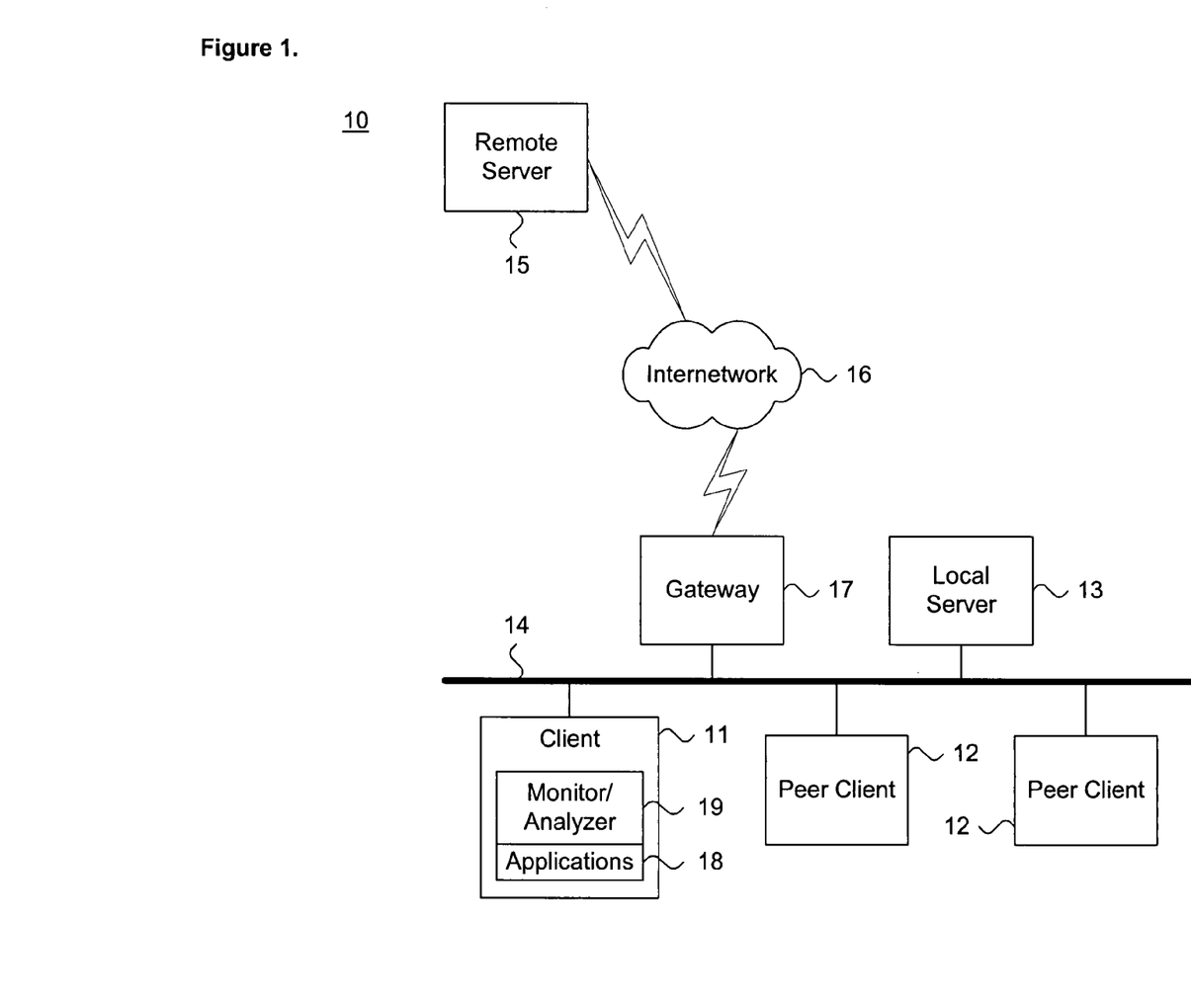
FIG. 1 is a block diagram showing a distributed computing environment including a system for dynamically detecting computer viruses through associative behavioral analysis, of runtime state in accordance with the present invention.

FIG. 1 is a block diagram showing a distributed computing environment 10 including a system for dynamically detecting computer viruses through associative behavioral analysis of runtime state in accordance with the present invention A client system 11 and a plurality of peer client systems 12 receive services from a local server 13 over a local area intranetwork 14. These services include standard network host services, including serving Web pages, hosting electronic mail services, managing files, information exchange, and the like. Other services and host configurations are feasible. In addition, a remote server 15 can be accessed via a wide area internetwork 16 that is interconnected with the intranetwork 14 via a gateway 17 or similar interfacing device. The client system 11 includes a monitor/analyzer 19 for dynamically detecting computer viruses, as further described below with reference to FIG. 3, and a plurality of application programs 18, executing in a conventional manner.

The individual computer systems 11, 12, 13, 15 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
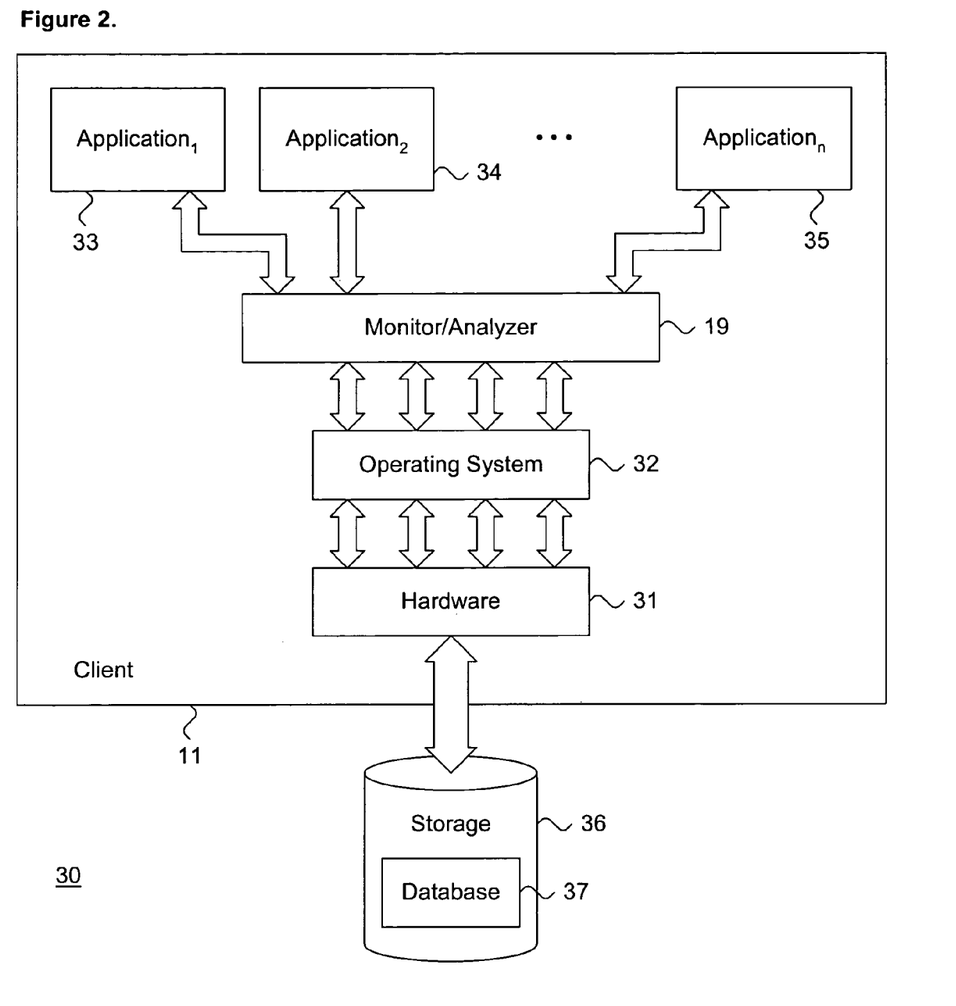
FIG. 2 is a block diagram showing a detailed view of a client system for dynamically detecting computer viruses for use in the system of FIG. 1.

FIG. 2 is a block diagram showing a detailed view 30 of a client system 11 for dynamically detecting computer viruses for use in the system of FIG. 1. The system 11 includes hardware 31 structured in a Von Neumann architecture, including a central processing unit (CPU), random access memory (RAM), storage device 36, and computational logic, as is conventional in the art. Resource allocation and control is managed by an operating system 32, such as the Windows NT operating system, licensed by Microsoft Corporation, Redmond, Wash. A plurality of applications 33, 34, 35 are loaded into the RAM from storage device 36 and executed by the CPU.

The program state of the executing applications 33, 34, 35 is monitored by the monitor/analyzer 19 that generates histograms based on occurrences of monitored events. The monitor/analyzer 19 functions as a logical "shim" interposed between the operating system 32 and each of the applications 33, 34, 35. Each system call is intercepted by the monitor/analyzer 19 which compares the requested system call to a list of monitored events. If the system call matches one of the monitored events, the monitor 19 determines whether the application is performing a sequence of "suspicious" actions characteristic of computer viruses. If so, histograms of the event occurrences are generated and stored in a database 37 maintained in the storage device 36. Alternatively, the histograms could be stored in a centralized database for analysis of distributed runtime state, such as described in the related, commonly-assigned U.S. Patent application, entitled "System And Method For Dynamically Detecting Computer Viruses Through Behavioral Analysis Of Distributed Runtime State Using An Analysis Tree," filed May 26, 2000, pending, the disclosure of which is incorporated herein by reference. The histograms are analyzed to identify repetitions of suspect behavior.

Figure 3:
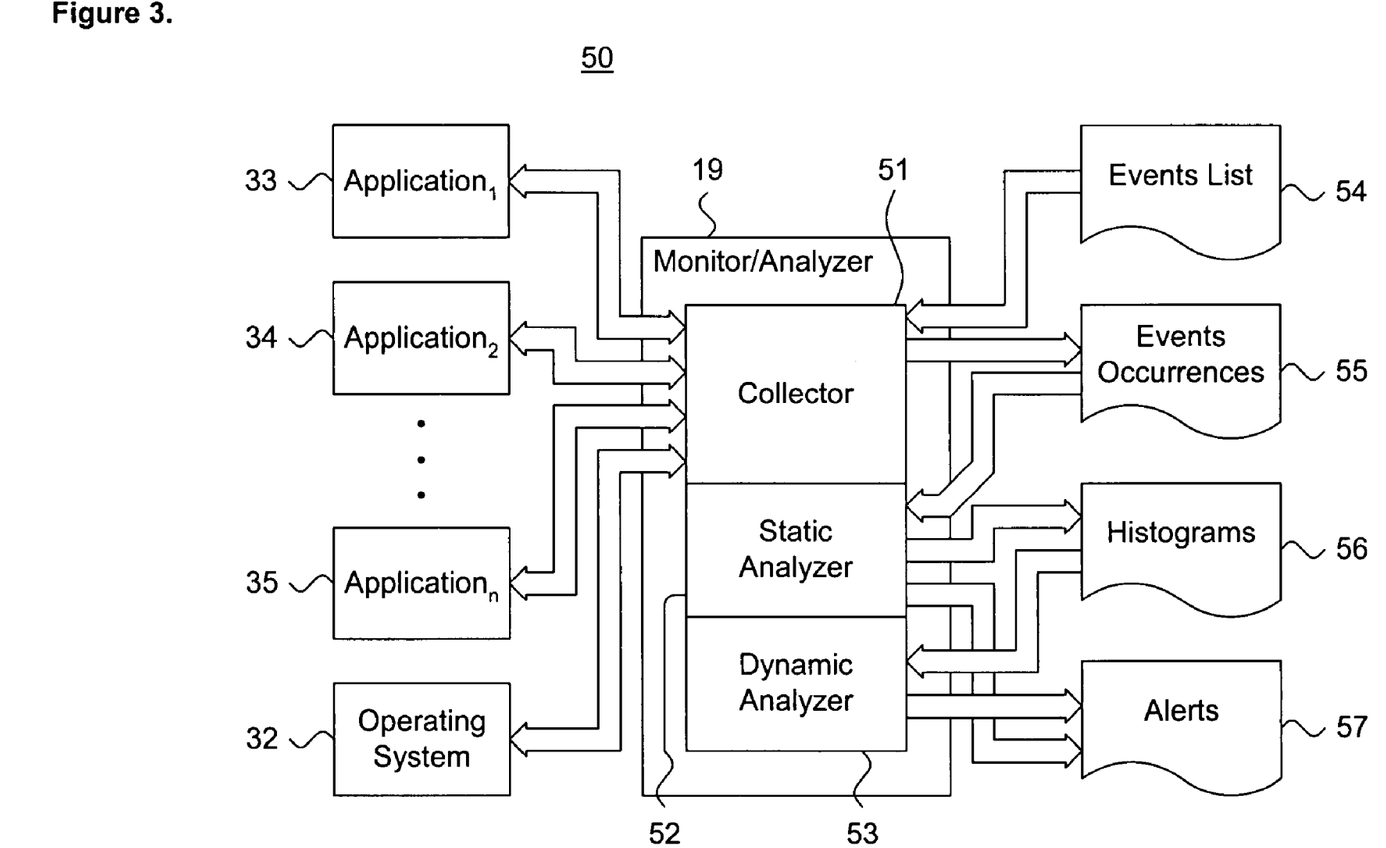
FIG. 3 is a block diagram showing the functional software modules of the monitor/analyzer of FIG. 2.

FIG. 3 is a block diagram showing the functional software modules 50 of the monitor/analyzer 19 of FIG. 1. Each module is a computer program written as source code in a conventional programming language, such as the C or C++ programming languages, and is presented for execution by the CPU as object or byte code, as is known in the art. The various implementations of the source code and object and byte codes can be held on a computer-readable storage medium or embodied on a transmission medium in a carrier wave.

The monitor/analyzer 19 consists of three components: collector 51, static analyzer 52, and dynamic analyzer 53. The collector 51 receives a list of events 54 to monitor. The collector 51 then continuously monitors the state of the executing applications 33, 34, 35 for an occurrence of the monitored events 54. System calls generated by the applications 33, 34, 35 are intercepted by the collector 51 and are forwarded to the operating system 32. System call responses are similarly intercepted and forwarded to the applications 33, 34, 35 as necessary. Those system calls which match one of the monitored events are logged as event occurrences 55.

The set of event occurrences 55 are analyzed by the static analyzer 52 for patterns of "suspicious" events. The static analyzer 52 performs behavior checking and generates alerts 57 if unusual program behavior is observed. The static analyzer 52 also generates histograms 56 of the occurrences of suspect patterns. The histograms 56 are analyzed by the dynamic analyzer 53 which identifies behavioral repetitions within the histograms 56 which indicate behavior characteristic of a computer virus. Repeated patterns of suspect behavior associated with two or more of the applications 33, 34, 35 indicate potentially viral activities. These patterns are reported as alerts 57.

The monitor/analyzer 19 operates in accordance with a sequence of process steps, as further described below beginning with reference to FIG. 5.

Figure 4:
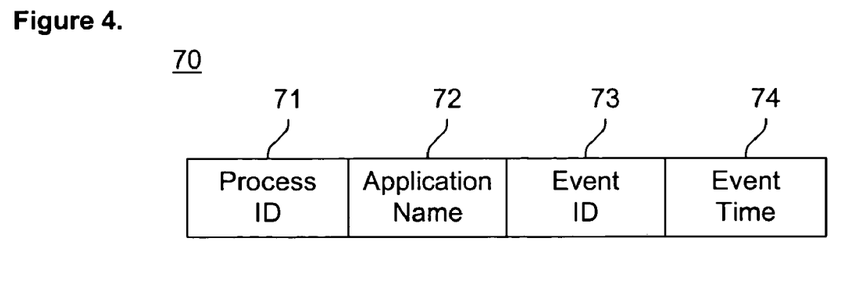
FIG. 4 is a data structure diagram showing an event log record used in the database of FIG. 2.

FIG. 4 is a data structure diagram showing an event log record 70 used in the database 37 of FIG. 2. Each record 70 is organized into four fields. The process identifier (ID) 71 and application name 72 fields respectively store the process number and name of the application 33, 34, 35 (shown in FIG. 2) to which the recorded monitored event is associated. Similarly, the event identifier (ID) 73 and event time 74 fields store the number of the monitored event and the time at which the monitored event occurred. The data stored in the event log records 70 is used to generate histograms of specific event sequences.

Figure 5:
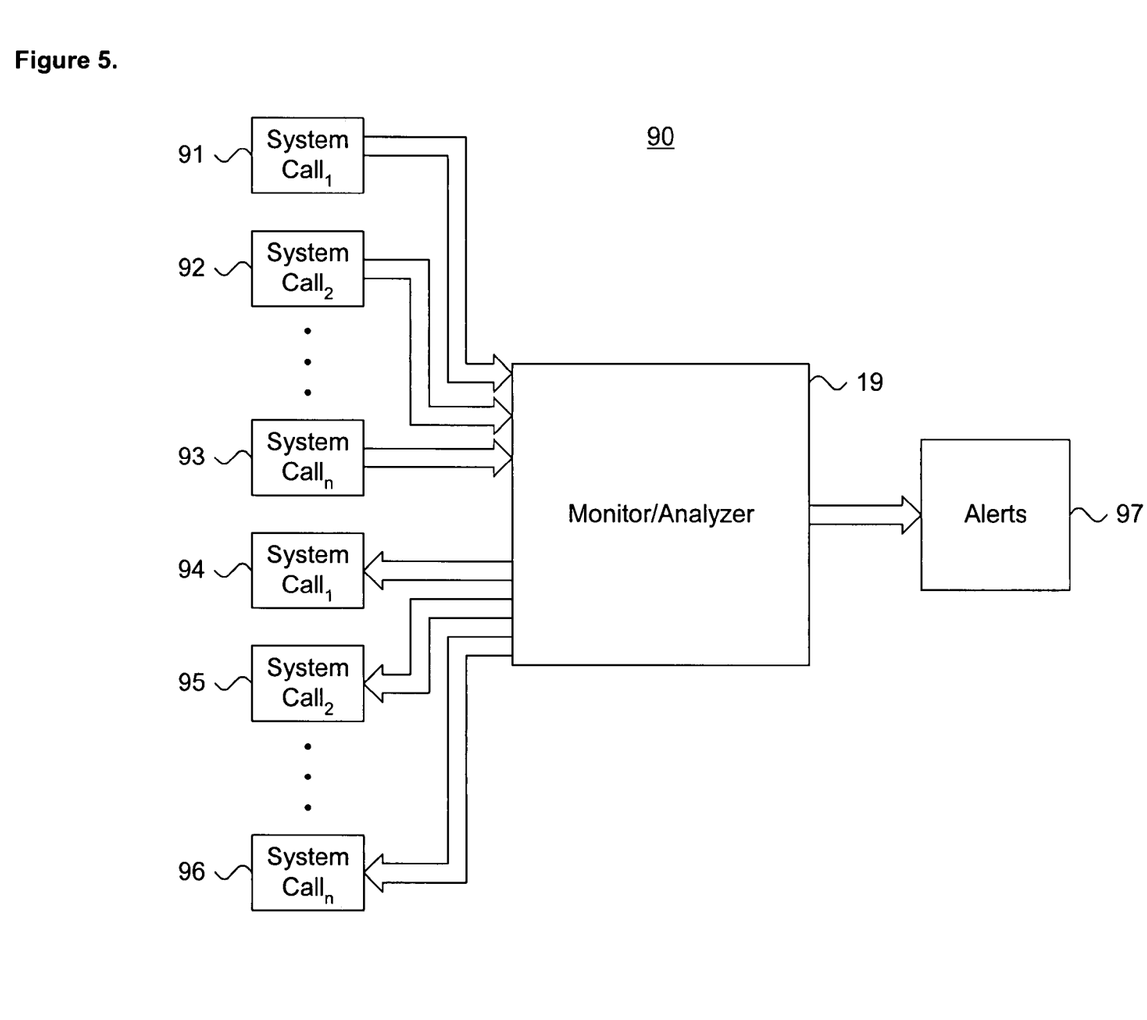
FIG. 5 is a process diagram showing the flow of requests and actions through the monitor/analyzer of FIG. 3.

FIG. 5 is a process diagram 90 showing the flow of requests and actions through the monitor/analyzer 19 of FIG. 3. The monitor/analyzer 19 executing on the client 11 receives incoming system calls 91, 92, 93 generated by the applications 33, 34, 35 (shown in FIG. 2) and forwards any system call responses 94, 95, 96 back to the requesting applications 33, 34, 35. Alerts 97 are generated as "suspect" behavior is observed by the monitor/analyzer 19.

In the described embodiment, the following categories of events are monitored:

(1) Files accesses, including read, write, redirection, open, close, and modify operations;
(2) Program executions;
(3) Direct disk accesses, particularly boot sector accesses;
(4) Media formatting operations;
(5) Sending of electronic mail;
(6) System configuration area accesses, such as Registry files;
(7) Changes to security settings;
(8) Impersonations; and
(9) System calls having the ability to monitor system input/output activities.

The foregoing list of monitored event categories is non-exclusive and other events could be included.

Specific sequences of the monitored events are organized into histograms which identify behavior characteristic of computer viruses. For example, a widely used virus replication technique infects by appending viral program code to the end of an application file. The replication sequence consists of four events, described as follows:

$event_{(1.1)}$: open application program file;
$event_{(1.2)}$: reposition file pointer to end of application program file;
$event_{(1.3)}$: write n bytes of new data; and
$event_{(1.4)}$: close application program file.

Here, the number of new data bytes n written is the key: a pattern of the same number of bytes n repeatedly written into different application program files at the end of the files indicates potentially viral activity.

An example of an electronic mail-based computer virus steals addresses from an address book, such as the Outlook 2000 application, licensed by Microsoft Corporation, Redmond, Wash., and propagates via the electronic mail system. The sequence consists of four events, described as follows:

$event_{(2.1)}$: open an address book for an electronic mail application;
$event_{(2.2)}$: create an electronic mail message with an attachment having m bytes;
$event_{(2.3)}$: repeating $event_{(2.2)}$ for one or more of the names in the address book; and
$event_{(2.4)}$: closing the address book.

Here, the number of bytes in the attachment m can be tracked and a repeated pattern would indicate potential replication.

An example of an "impersonation" occurs when a virus program changes file characteristics to match those of a privileged and typically well-known systems program. The sequence consists of three events, described as follows:

$event_{(3.1)}$: launch a privileged application;
$event_{(3.2)}$: query the security attributes, permissions, and other file characteristics of the privileged application; and
$event_{(3.3)}$: modify the security attributes, permissions, and other file characteristics of the virus program to match those of the privileged application.

Finally, an example of illicit input/output monitoring activity includes a sequence consisting of two events, described as follows:

$event_{(4.1)}$: launch the illicit monitoring application; and
$event_{(4.2)}$: register the illicit monitoring application with the operating system as an input/output system monitor.

Still other sequences characteristic of computer virus behaviors are described in M. Ludwig, "The Giant Black Book of Computer Viruses," Part I, pp. 27–271, Am. Eagle Pub., Inc. (2d ed. 1998), the disclosure of which is incorporated herein by reference.

Figure 6:
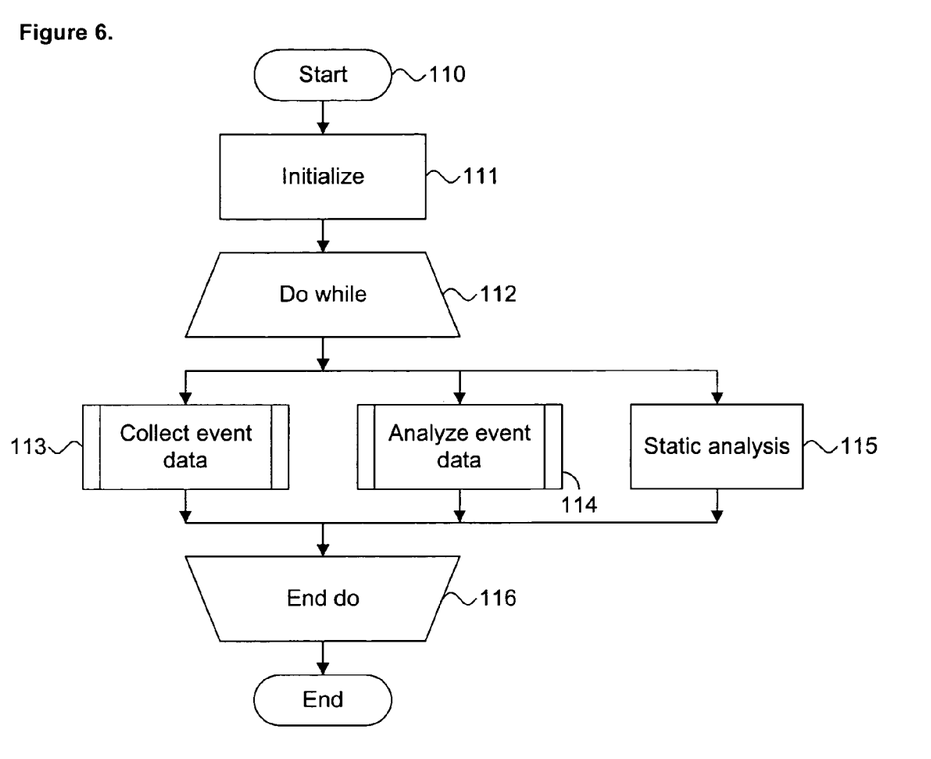
FIG. 6 is a flow diagram showing a method for dynamically detecting computer viruses through associative behavioral analysis of runtime state in accordance with the present invention.

FIG. 6 is a flow diagram showing a method for dynamically detecting computer viruses through associative behavioral analysis of runtime state 110 in accordance with the present invention. First, the monitor/analyzer 19 is initialized (block 111) by loading the monitored events form the events list 54 (shown in FIG. 3). Execution then continues in three substantially concurrent threads which are iteratively processed (blocks 112–116). In the first thread, event data consisting of observed occurrences of monitored events is collected (block 113), as further described below with reference to FIG. 7. In the second thread, the event data is analyzed (block 114), as further described below with reference to FIG. 8. Finally, in the third thread, the event data is statically analyzed for patterns of "suspicious" events (block 115) using behavioral checking, such as described in M. Ludwig, "The Giant Black Book of Computer Viruses," Ch. 23, pp. 273–280, Am. Eagle Pub., Inc. (2d ed. 1998), the disclosure of which is incorporated herein by reference. The execution threads continue execution until the program is terminated.

Figure 7:
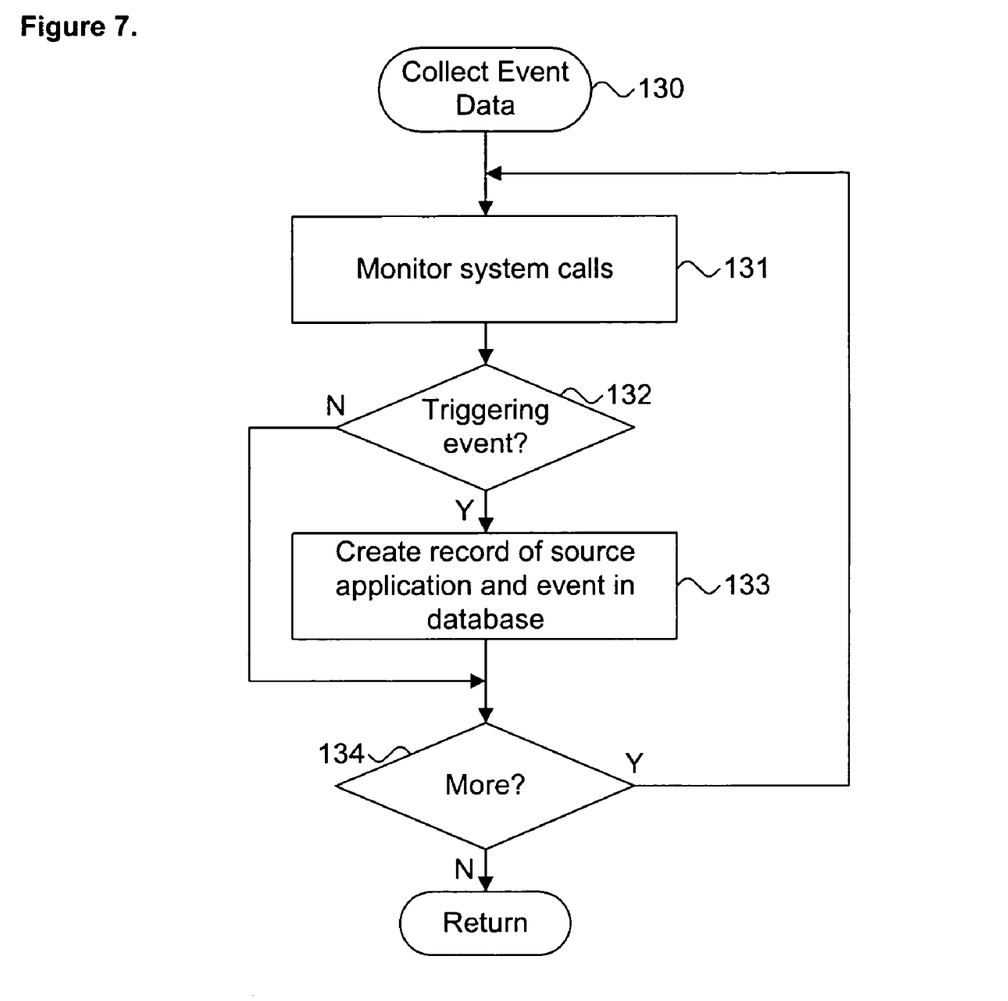
FIG. 7 is a flow diagram showing the routine for collecting suspicious event data for use in the method of FIG. 6.

FIG. 7 is a flow diagram showing the routine for collecting suspicious event data 130 for use in the method of FIG. 6. The purpose of this routine is to collect data for those system calls 91, 92, 93 (shown in FIG. 5) that match one of the monitored events in the events list 54 (shown in FIG. 3). Thus, system calls are monitored (block 131). If the monitored system call matches a triggering event (block 132), an event log record 70 (shown in FIG. 4) is created and the event is stored in the database 37 (block 133). If there are more system calls to be monitored (block 134), processing continues as before (block 131). Otherwise, the routine returns.

Figure 8:
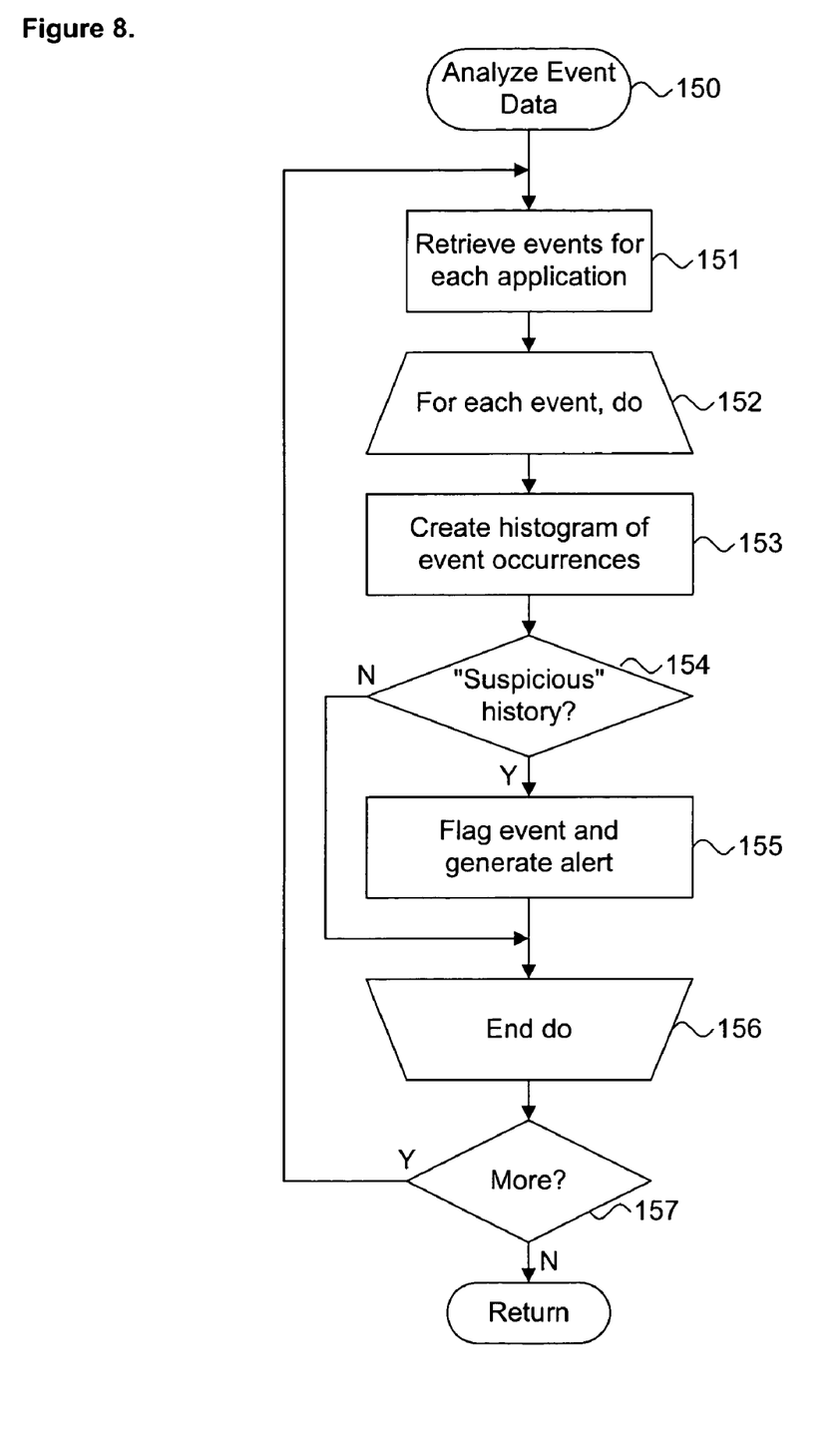
FIG. 8 is a flow diagram showing the routine for analyzing suspicious event data for use in the method of FIG. 6.

FIG. 8 is a flow diagram showing the routine for analyzing suspicious event data 150 for use in the method of FIG. 6. The purpose of this routine is to analyze the stored monitored events in the database 37 (shown in FIG. 2) by generating histograms 56 (shown in FIG. 3) and identifying repetitions of suspicious behavioral patterns. First, the records for the monitored events 70 are retrieved for each of the applications 33, 34, 35 (block 151). Next, each of the retrieved events are analyzed in an iterative processing loop (blocks 152–156) as follows. First, a histogram of event occurrences is created (block 153). If the histogram indicates a history of "suspicious" activities (block 154), the monitored event is flagged and an alert is generated (block 155). If there are more records in the database (block 157), processing continues as before (block 151). Otherwise, the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically detecting computer viruses through associative behavioral analysis of runtime state, comprising:
   a parameter set stored on a client system defining a group of monitored events, each monitored event comprising a set of one or more actions defined within an object, each action being performed by one or more applications executing within a defined computing environment;
   a monitor executing on the client system, comprising:
      a collector continuously monitoring runtime state within the defined computing environment for an occurrence of any one of the monitored events in the group and tracking a sequence of execution of the monitored events for each of the applications;
      an analyzer identifying each occurrence of a specific event sequence characteristic of behavior of a computer virus and the application which performed the specific event sequence, creating a histogram describing the specific event sequence occurrence for each of the applications, and identifying repetitions of the histogram associated with at least one object;
      a storage manager organizing the histograms into plurality of records ordered by object, application, and monitored event; and
      a structured database in which the plurality of records is stored;
   wherein the storage manager stores each histogram for each such specific event sequence occurrence in one such database record identified by the application by which the specific event sequence was performed;
   wherein the storage manager configures the structured database as an event log organized by each event in the group of monitored events and updates the database record storing each specific event sequence occurrence with a revised histogram as each such occurrence is identified.

2. A system according to claim 1, further comprising:
   the analyzer detecting suspect activities within each histogram, each suspect activity comprising a set of known actions comprising a computer virus signature.

3. A system according to claim 2, wherein each such suspect activity is selected from a class of actions comprising file accesses, program executions, message transmissions, configuration area accesses, security setting accesses, and impersonations.

4. A system according to claim 2, wherein each such suspect activity is selected from a group comprising files accesses, program executions, direct disk accesses, media formatting operations, sending of electronic mail, system configuration area accesses, changes to security settings, impersonations, and system calls having the ability to monitor system input/output activities.

5. A system according to claim 1, wherein the computer virus comprises at least one form of unauthorized content selected from a group comprising a computer virus application, a Trojan horse application, and a hoax application.

6. A method for dynamically detecting computer viruses through associative behavioral analysis of runtime state, comprising:
   defining a group of monitored events, each monitored event comprising a set of one or more actions defined within an object, each action being performed by one or more applications executing within a defined computing environment;
   continuously monitoring runtime state within the defined computing environment for an occurrence of any one of the monitored events in the group;
   tracking a sequence of execution of the monitored events for each of the applications;
   identifying each occurrence of a specific event sequence characteristic of behavior of a computer virus and the application which performed the specific event sequence;
   creating a histogram describing the specific event sequence occurrence for each of the applications;
   identifying repetitions of the histogram associated with at least one object;
   organizing the histograms into plurality of records ordered by object, application, and monitored event;
   maintaining a structured database in which the plurality of records is stored;
   storing each histogram for each such specific event sequence occurrence in one such database record identified by the application by which the specific event sequence was performed;
   configuring the structured database as an event log organized by each event in the group of monitored events; and
   updating the database record storing each specific event sequence occurrence with a revised histogram as each such occurrence is identified.

7. A method according to claim 6, further comprising:
   detecting suspect activities within each histogram, each suspect activity comprising a set of known actions comprising a computer virus signature.

8. A method according to claim 7, wherein each such suspect activity is selected from a class of actions comprising file accesses, program executions, message transmissions, configuration area accesses, security setting accesses, and impersonations.

9. A method according to claim 7, wherein each such suspect activity is selected from a group comprising files accesses, program executions, direct disk accesses, media formatting operations, sending of electronic mail, system configuration area accesses, changes to security settings, impersonations, and system calls having the ability to monitor system input/output activities.

10. A method according to claim 6, wherein the computer virus comprises at least one form of unauthorized content selected from a group comprising a computer virus application, a Trojan horse application, and a hoax application.

11. A computer-readable storage medium holding code for dynamically detecting computer viruses through associative behavioral analysis of runtime state, comprising:

defining a group of monitored events, each monitored event comprising a set of one or more actions defined within an object, each action being performed by one or more applications executing within a defined computing environment;

continuously monitoring runtime state within the defined computing environment for an occurrence of any one of the monitored events in the group;

tracking a sequence of execution of the monitored events for each of the applications;

identifying each occurrence of a specific event sequence characteristic of behavior of a computer virus and the application which performed the specific event sequence;

creating a histogram describing the specific event sequence occurrence for each of the applications;

identifying repetitions of the histogram associated with at least one object;

organizing the histograms into plurality of records ordered by object, application, and monitored event;

maintaining a structured database in which the plurality of records is stored;

storing each histogram for each such specific event sequence occurrence in one such database record identified by the application by which the specific event sequence was performed;

configuring the structured database as an event log organized by each event in the group of monitored events; and updating the database record storing each specific event sequence occurrence with a revised histogram as each such occurrence is identified.

12. A storage medium according to claim 11, further comprising:

detecting suspect activities within each histogram, each suspect activity comprising a set of known actions comprising a computer virus signature.

* * * * *

UNITED STATES PATENT AND TRADEMARK OFFICE
CERTIFICATE OF CORRECTION

PATENT NO. : 6,973,577 B1  Page 1 of 1
APPLICATION NO. : 09/579810
DATED : December 6, 2005
INVENTOR(S) : Kouznetsov It is certified that error appears in the above-identified patent and that said Letters Patent is hereby corrected as shown below:

IN THE SPECIFICATIONS:

In the Cross-Reference to Related Application:
col. 1, line 13 replace "Behavioral." with --Behavioral--.

Signed and Sealed this

Ninth Day of November, 2010

David J. Kappos
*Director of the United States Patent and Trademark Office*